April 21, 1925.  1,534,699

J. I. GARDNER

CLUTCH RELEASE

Filed March 18, 1924

Witness:
Harry E. Seidel

Inventor
J. I. Gardner,
By Munn & Co.
Attorney

Patented Apr. 21, 1925.

1,534,699

UNITED STATES PATENT OFFICE.

JOSEPH IVAN GARDNER, OF LAKESIDE, ARIZONA.

CLUTCH RELEASE.

Application filed March 18, 1924. Serial No. 700,065.

*To all whom it may concern:*

Be it known that I, JOSEPH IVAN GARDNER, a citizen of the United States, and a resident of Lakeside, in the county of Navajo and State of Arizona, have invented certain new and useful Improvements in Clutch Releases, of which the following is a specification.

This invention relates to tractors and is more particularly directed to a clutch release adapted for use in connecting a trailer or some form of load to said tractor.

An object of the invention is the provision of a device operatively connected to the clutch of a tractor and adapted to connect a load with the tractor in such a manner that an increase in pull exerted by the load will cause a release of the clutch and consequent stoppage of said tractor.

A further object of the invention is the provision of a device adapted to release the clutch of a tractor when an increase in the load on the tractor passes a predetermined point, with means for varying the resistance to the clutch release.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

Figure 1:
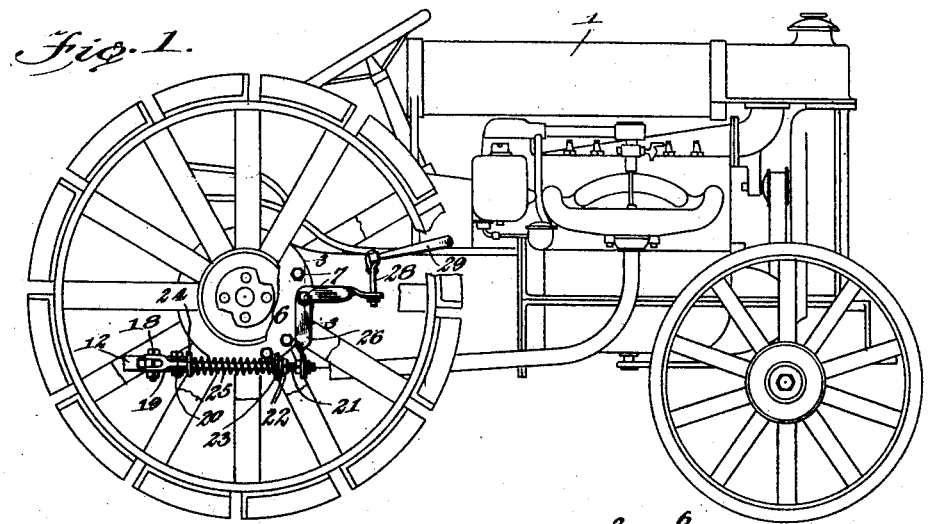
Figure 1 is a side view of a Fordson tractor showing my invention installed.
Figure 3:
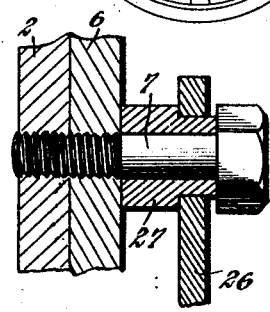
Figure 3 is a fragmentary sectional view of pivotal mounting for the clutch releasing device.
Figure 2:
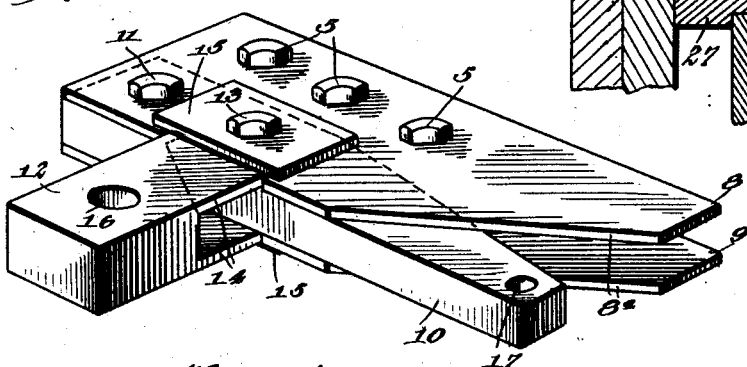
Figure 2 is a view in perspective of an element of the clutch releasing device.
Figure 4:
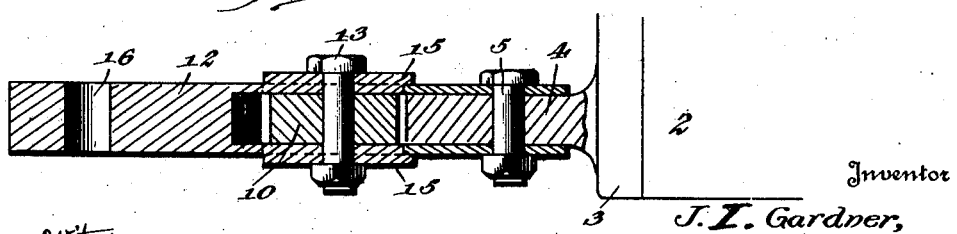
Figure 4 is a longitudinal vertical section of the device shown in Figure 2.

Referring more particularly to the drawing, 1 designates generally a tractor known as the "Fordson" tractor, to which is connected at the worm wheel housing 2 a draw bar cap 3. A draw bar 4 is perforated to receive bolts 5 for connecting a trailer or some form of load to the tractor. The sections of the rear axle housing 6 are secured in axial alinement to the worm wheel or differential housing 2 by means of bolts 7.

A pair of plates 8 and 9 are spaced from each other by a lever 10 fulcrumed on a bolt 11 which passes through perforations in adjacent corners of the said plates. The plates are sheared off at an angle as shown at 8ª for a purpose which will be presently described. The plates are provided with perforations alining with the perforations in the draw bar 4 to receive the bolts 5 for securing the plates to said draw bar.

An auxiliary draw bar 12 is pivotally connected to the lever 10 by a bolt 13. The inner end of the draw bar is bifurcated providing legs 14 which straddle the lever. Guide plates 15 located upon opposite sides of the draw bar 12, in engagement with the legs of the draw bar and overlapping the plates 8 and 9 are held in place by the bolt 13. The outer end of draw bar 12 is provided with a perforation 16 adapted to receive some form of connecting means for a trailer or load drawn by the tractor.

The free end of lever 10 is reduced and perforated at 17 to receive a bolt 18. The forked end 19 of a rod 20 straddles the free end of said lever and is similarly perforated to receive the bolt 18. The rod passes between the plates 8 and 9 adjacent the sheared portions 8ª. The other end of the rod is threaded at 21 to receive a nut 22 and a washer 23. A second washer 24 is in engagement with the inner ends of the plates 8 and 9. A coil spring 25 encircles the rod 20 and has its opposite ends abutting the washers 23 and 24 and is adapted to be compressed between said washers when a load is placed upon the draw bars.

The threaded end of rod 20 passes through a perforation rectangular in cross section in the bell crank lever 26 which allows both rod 20 and the bell crank lever 26 to move freely. The inside nut is a lock nut for nut 22. The bell crank lever is pivotally mounted on a bushing 27 on the bolt 7 which secures the axle housing 6 to the worm housing 2 as shown in Figure 1. The horizontal arm of the bell crank lever has its end perforated to receive a link 28 which is swingably mounted on the clutch pedal 29 of the tractor. Since the link is slidable through the perforated end of the horizontal arm of the bell crank lever, the clutch pedal may be operated without interference from the bell crank lever. The sheared portions 8ª of the plates 8 and 9 form an abutment for the shoulders at the inner end of the fork 19 on the rod 20 and thus limit the inward movement of said rod against the tension of the spring 25.

The operation of my device is as follows: The spring 25 is sufficiently strong to resist a predetermined load on the lever 10 and since the rod 20 is connected to the outer free end of lever 10 the spring will bear but a small percentage of the load on the auxiliary draw bar 12. This is in accordance with the well known law of a lever fulcrumed at one end with the load acting in one direction proximate the fulcrum and a resistance at the end of the lever which is opposite the fulcrum, with the resistance in opposition to the load. Therefore when the load on the auxiliary draw bar becomes greater than what the strength of the spring is intended to normally resist, the lever 10 is oscillated towards the load rocking the bell crank lever 26, so that the outer free end of the horizontal arm of the bell crank lever is depressed thus pulling down upon the link 28 and actuating the clutch pedal 29 which releases the clutch and stops the tractor. The obvious result is that whatever load is intended to be drawn by the tractor will not have any effect upon the mechanism for operating the clutch pedal, but where the load meets with an obstruction, which unnecessarily increases the load and places a dangerous strain upon the tractor, the lever 12 will be actuated to release the clutch.

What I claim is:

In a tractor, the combination of a clutch pedal, a lever having pivotal connections with the tractor, a draw bar pivotally connected with the lever, a bell crank lever pivoted on the tractor body with one arm provided with a perforation, a link connected with the clutch pedal passing through the perforation in the arm of the bell crank lever, means on the free end of the link adapted to engage the arm of the bell crank lever for moving it in one direction while permitting the bell crank lever to be moved without operating the clutch pedal, a rod connecting the other arm of the bell crank lever with the first mentioned lever, and a spring interposed between the bell crank lever and the first mentioned lever for resisting actuation of the bell crank lever until the load has been increased beyond a predetermined degree.

JOSEPH IVAN GARDNER.